United States Patent
Sarver et al.

(10) Patent No.: US 6,565,787 B1
(45) Date of Patent: May 20, 2003

(54) NON-GLOSSING THERMOFORMED FILM

(75) Inventors: Larry D. Sarver, New Britain, CT (US); Antonio A. Diaz, Newington, CT (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 09/569,639

(22) Filed: May 12, 2000

(51) Int. Cl.$^7$ ................................................ B29C 43/24
(52) U.S. Cl. ........................ 264/175; 264/167; 264/284; 428/141; 428/412
(58) Field of Search ............................... 428/141, 412; 264/175, 167, 284

(56) References Cited

U.S. PATENT DOCUMENTS

| | | | |
|---|---|---|---|
| 3,539,671 A | 11/1970 | Nauta | 264/102 |
| 3,619,446 A | 11/1971 | Nauta | 264/102 |
| 4,190,684 A | 2/1980 | Barwell et al. | 427/194 |
| 4,211,743 A | 7/1980 | Nauta et al. | 264/284 |
| 4,329,309 A * | 5/1982 | Kelly | 264/154 |
| 4,368,240 A | 1/1983 | Nauta et al. | 428/447 |
| 4,454,294 A | 6/1984 | Zentner et al. | 526/344.3 |
| 5,076,987 A | 12/1991 | Wank et al. | 264/210.2 |

FOREIGN PATENT DOCUMENTS

CA          1 276 166        6/1972

* cited by examiner

Primary Examiner—William P. Watkins, III
(74) Attorney, Agent, or Firm—Joseph C. Gil; Aron Preis; James R. Franks

(57) ABSTRACT

A process of calendering a sheet or a film having at least one textured surface entailing passing a web of polymeric resin through a nip between a rigid roll and a resilient roll is disclosed. The inventive process comprises slowing down the cooling rate of the web by rolling its textured surface about the resilient roll. The rate of cooling is in comparison to a corresponding process where the web is rolled about said rigid roll. Products thus produced are suitable for making thermoformed articles having low gloss.

6 Claims, 2 Drawing Sheets

NON-GLOSSING THERMOFORMED FILM

The invention is directed to thermoplastic films and more particularly to a process for making films having controlled surface finish.

SUMMARY OF THE INVENTION

A process of calendering a sheet or a film having at least one textured surface entailing passing a web of polymeric resin through a nip between a rigid roll and a resilient roll is disclosed. The inventive process comprises slowing down the cooling rate of the web by rolling its textured surface about the resilient roll. The rate of cooling is in comparison to a corresponding process where the web is rolled about said rigid roll. Products thus produced are suitable for making thermoformed articles having low gloss.

BACKGROUND OF THE INVENTION

In the extrusion and subsequent calendering of synthetic thermoplastic films (in the present context, the term "film" refers to sheets and to films) it is frequently desirable to use at least one roll which has a relatively resilient surface in order to maintain relatively uniform pressures across the width of the sheet material and to compensate for variation in the thickness of the sheet passing into the nip between a pair of cooperating rolls. While in some instances, two resiliently faced rolls may be employed, generally most applications use a combination of one resilient roll with one rigid roll such as a steel roll. Such combinations are often employed for preparing sheets, or films having embossed surfaces and/or polished surfaces. As used herein, the term "textured", in reference to the surface of a sheet, includes textured surfaces and surfaces exhibiting high gloss.

It has long been recognized that when films having textured surfaces are subjected to subsequent heating, such as in the course of thermoforming, they often warp or lose at least some of their texture. Matted surfaces often become undesirably glossy.

The present invention is directed to an improvement in the process for making films having textured surfaces. Textured films produced in accordance with the present invention feature greater surface stability. The process of thermoforming, or, for that matter, any subsequent thermal treatment, would not easily destroy the surface characteristics which has been imparted to the sheet by calendering.

BRIEF DESCRIPTION OF THE FIGURES

The present invention will now be described for purposes of illustration and not limitation in conjunction with the figures, wherein.

DETAILED DESCRIPTION OF THE INVENTION

Apparatus and rolls relevant to calendering of sheets have been disclosed in the literature including U.S. Pat. Nos. 4,211,743 and 5,076,987, the disclosures of which are incorporated herein by reference. Rolls having a resilient face are referred to in the present context as rubber rolls as they are often developed by casting a synthetic resin coating, for instance, un-vulcanized rubber, thermoplastic material or silicon resin, against a female mold surface. The surface of the rubber roll may be designed so that it imparts to the film a highly polished or a particularly textured surface. Such rolls have been described in the literature including U.S. Pat. Nos. 3,539,671; 3,619,446; 4,190,684; 4,368,240; the specifications of which are incorporated herein by reference. Rigid rolls, such as a conventional steel roll, including plated, chrome plated and polished steel rolls are well known and is widely used in the industry. The processes for the manufacture of film and sheets using such rolls are likewise well documented.

The present invention represents an improvement over the conventional method for preparing textured thermoplastic web material.

In the conventional process, extruded sheet, web or film, is first introduced into a nip between a set of cooperatively rotating rigid roll and resilient roll. In the course of passing through the nip, the surface of the sheet is embossed or otherwise textured and is then made to cool rapidly by rolling it around the rigid roll, and optionally then over at least one additional subsequent roll.

Figure 1:
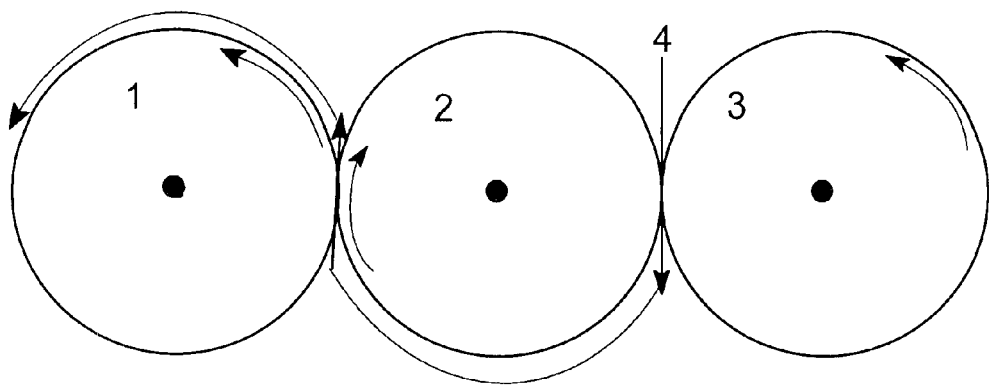
FIG. 1 depicts a conventional process.

The conventional process is diagramed in FIG. 1.

In FIG. 1, 1 denotes an optional rigid roll, 2 refers to a rigid roll, 3 refers to a resilient roll. 4 refers to a web exiting an extrusion die—not shown. The rolls rotate about their axes in the directions as shown.

In accordance with the conventional process, web 4 leaves the film die at a temperature of about 530 to 600° F. and is introduced into a gap between the resilient roll 3 and rigid roll 2. The film then cools down as it loops under 2 and over 1 and is then collected as a final product. Because of its positioning, its material and surface characteristics, roll 3 determines the characteristics of the bottom surface of the final product. In the conventional set-up, rubber roll 3 operates at a surface temperature of about 200 to 250° F. In the drawing, rigid roll 2 determines the characteristics of the top surface of the final product. In the conventional process, the surface of the rigid roll 2, may be a polished steel roll or it may be chrome-plated. It may also be textured steel. Its surface temperature is about 210 to 230° F. The optional roll 1 is typically a rigid steel roll 1 which could be of a polished or chrome plated surface; it operates at a surface temperature lower than 350° F., preferably 275 to 300° F. The purpose of roll 1 depends on a number of conditions: for thicker films, it accelerates the cooling since the heat transfer rate through the polymer into the cool roll 2 is too slow to allow roll 2 to fully attain the necessary cooling. For thinner films, it actually adds some heat back into the product because roll 2 is able to cool the sheet so completely that reheating on roll 1 improves the overall flatness of the product. The transition in the function of the roll from cooling to heating depends on the thickness of the film and the residence-time of the film on the roll, that is the speed of the line and the diameter of the roll.

In the conventional process, the film enters the first nip, between 3 and 2 and momentarily contacts the surface of roll 3 as it passes through the nip. The film is then made to wrap around 2 for about 90 to 270° of the rotation of roll 2 before it is transferred on to roll 1.

Figure 2:
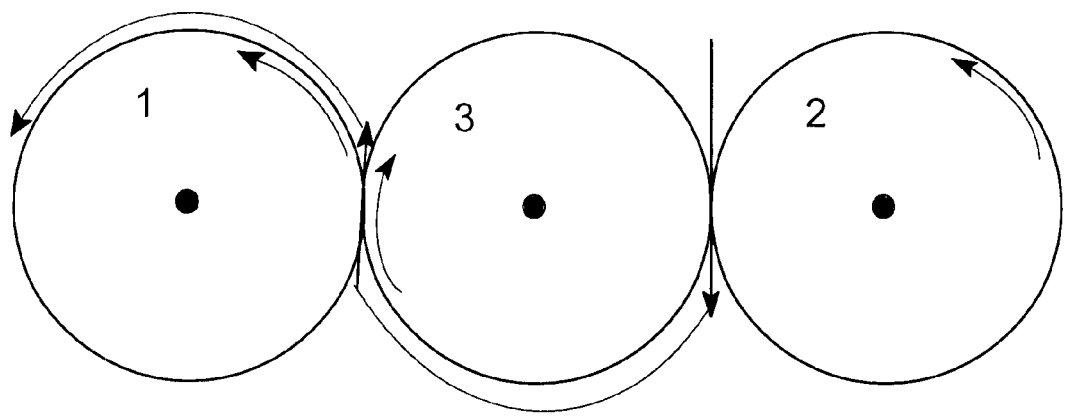
FIG. 2 depicts the process of the present invention.

The present invention, diagramed in FIG. 2, is directed to an improvement in the process whereby the embossed web emerging from the nip is made to roll about a rotating resilient, rubber roll.

Accordingly, film 4 leaves the film die as described above for the conventional process and enters the gap between roll 2 and roll 3 and as noted in the drawing, loops under roll 3 and over roll 1 and is collected thereafter as final product. The inventive process differs from the conventional one in terms of the relative positions of rolls 3 and 2 and their surface temperatures. Rolls 2 and 3 are positioned as shown and roll 3 operates at a surface temperature estimated at about 275° F. to 350° F. In the ideal process, the middle roll, 3, runs as hot as possible, yet cool enough to permit a release from the roll and transfer to roll 1. Because the release characteristics of the rubber roll are so different from the steel roll, the temperatures on the rubber middle roll are generally higher than a steel roll in the same position. The steel roll, 2, generally runs at the range of about 200 to 250° F.

As the film wraps about roll 3, it cools more slowly than it would have in the conventional process because of the heat transfer characteristics of the resilient roll. Although the present inventor does not wish to be bound to any particular explanation of the technical reason for the advantages resulting upon the inventive practice, it has been suggested that the slower cooling rate may allow the resulting film to undergo a greater degree of stress relief before its temperature drops below the melt temperature. The greater relaxation may explain the advantageous thermal stability characterizing the inventive sheet.

The present invention is advantageously employed with various synthetic thermoplastic materials including styrene/acrylonitrile copolymers, cellulose nitrate, propylene, polyethylene, cellulose acetate, acrylic acid esters, acetate-butyrate, polystyrene, polycarbonate, polyester, polysulfone and polyvinyl chloride and the like. The preferred resin is polycarbonate.

EXPERIMENTAL

The advantage residing in the inventive process has been observed upon a comparison between the gloss of a thermoformed film produced by the conventional process, where the rolls have been arranged as depicted in FIG. 1. Polycarbonate film produced conventionally exhibits gloss of about 4.0 to 4.5. The temperatures of the rolls were:

Roll 1=285° F., Roll 2=220° F. and Roll 3=225° F.

After conventional thermoforming, the film exhibits gloss values greater than 20.

A corresponding film produced in accordance with the inventive process, the rolls positioned as shown in FIG. 2, where the temperatures of the respective rolls were: Roll 1=280° F., Roll 2=300–325° F. surface temperature and Roll 3=200° F., the gloss before forming was about 2.8 to 3.5 and after thermoforming the gloss was 3.5 to 4.5.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In the process of calendering a product selected from the group consisting of film and sheet having at least one textured surface by passing a web of polymeric resin through a nip between a rigid roll and a resilient roll, the improvement comprising slowing the cooling rate of said web by rolling a textured surface thereof about said resilient roll at a temperature of about 275° F. to about 350° F., the rate being in comparison to the cooling of a corresponding web that is rolled about said rigid roll at a temperature of about 200° F. to about 250° F.

2. The process of claim 1 wherein the product is a film.

3. The process of claim 1 wherein the product is a sheet.

4. The process of claim 1 wherein the polymeric resin is selected from the group consisting of styrene/acrylonitrile copolymers, cellulose nitrate, propylene, polyethylene, cellulose acetate, acrylic acid esters, acetate-butyrate, polystyrene, polycarbonate, polyester, polysulfone and polyvinyl chloride.

5. The process of claim 4 wherein the polymeric resin is polycarbonate.

6. In the process of calendering a product selected from the group consisting of film and sheet having at least one textured surface by passing a web of polymeric resin through a nip between a rigid roll and a resilient roll, the improvement comprising rolling said textured surface of said web about said resilient roll at a temperature of about 275° F. to about 350° F. to effect slowing the cooling rate of said web, the rate being in comparison to the cooling of a corresponding web that is rolled about said rigid roll at a temperature of about 200° F. to about 250° F.

* * * * *